(12) United States Patent
Swanson et al.

(10) Patent No.: US 7,328,434 B2
(45) Date of Patent: Feb. 5, 2008

(54) SYSTEM AND METHOD FOR MANAGING CONFIGURABLE ELEMENTS OF DEVICES IN A NETWORK ELEMENT AND A NETWORK

(75) Inventors: Sheldon Keith John Swanson, Ottawa (CA); Kenneth Glenn MacQueen, Kanata (CA)

(73) Assignee: Alcatel Canada Inc., Kanata (CA)

( * ) Notice: Subject to any disclaimer, the term of this patent is extended or adjusted under 35 U.S.C. 154(b) by 404 days.

(21) Appl. No.: 10/252,703

(22) Filed: Sep. 24, 2002

(65) Prior Publication Data

US 2003/0140134 A1    Jul. 24, 2003

(30) Foreign Application Priority Data

Jan. 24, 2002    (CA)    .................................... 2369228

(51) Int. Cl.
    *G06F 9/445*      (2006.01)
    *G06F 15/177*     (2006.01)
    *G06F 15/173*     (2006.01)

(52) U.S. Cl. .................. 717/168; 717/170; 717/174; 717/176; 717/171; 709/220; 709/223

(58) Field of Classification Search ........ 717/100–178; 709/220–223
See application file for complete search history.

(56) References Cited

U.S. PATENT DOCUMENTS

| | | | | |
|---|---|---|---|---|
| 5,577,244 A * | 11/1996 | Killebrew et al. | .......... | 717/169 |
| 5,809,329 A * | 9/1998 | Lichtman et al. | .............. | 710/8 |
| 6,182,275 B1 * | 1/2001 | Beelitz et al. | .............. | 717/175 |
| 6,199,194 B1 * | 3/2001 | Wang et al. | .................. | 717/118 |
| 6,493,871 B1 * | 12/2002 | McGuire et al. | ............ | 717/173 |
| 6,513,159 B1 * | 1/2003 | Dodson | ....................... | 717/178 |
| 6,725,260 B1 * | 4/2004 | Philyaw | ....................... | 709/220 |
| 6,754,723 B2 * | 6/2004 | Kato | ............................. | 710/8 |
| 6,763,454 B2 * | 7/2004 | Wilson et al. | .................. | 713/1 |
| 6,892,159 B2 * | 5/2005 | Weiss et al. | ................. | 702/130 |
| 6,971,095 B2 * | 11/2005 | Hirai et al. | .................. | 717/173 |
| 7,178,141 B2 * | 2/2007 | Piazza | ......................... | 717/168 |
| 2002/0092008 A1 * | 7/2002 | Kehne et al. | ................ | 717/168 |

(Continued)

OTHER PUBLICATIONS

Morehouse et al., Windows XP Application Compatibility Technologies, Jun. 2001.*

(Continued)

*Primary Examiner*—Meng-Al T. An
*Assistant Examiner*—Insun Kang
(74) *Attorney, Agent, or Firm*—McCarthy Tetrault LLP

(57) ABSTRACT

The invention provides a system and a method of selecting a version of a program code from a series of program codes for a program element associated with a hardware element for a circuit board. The invention identifies a compatible program code for a particular hardware element and downloads the compatible program code. A record is associated with the hardware element to identify its compatible program codes. The program codes are stored in a bundle and are associated with a software code. A program loader, associated with each bundle, checks the compatibilities of the hardware element to both the software code and the selected program code. Another record stores compatibility information of the program codes with hardware element versions and is also associated with the bundle. Code downloads are made first to an inactive memory bank and after the codes are verified, the inactive memory bank is made active.

20 Claims, 5 Drawing Sheets

| Module | HFCL | HSCL | BHSCL | FSCL | BFSCL | Firmware ID | Firmware ID | Firmware ID | Software ID | Software ID | Software ID |
|---|---|---|---|---|---|---|---|---|---|---|---|
| 202A   CPU 130A Rel 1 | 1 (206A) | 1 | | | | FirmElem1 Rel 1 | FirmElem2 Rel 1 | FirmElem3 Rel 1 | SoftElem1 Rel 1 | SoftElem2 Rel 1 | SoftElem3 Rel 1 |
| 202B   CPU 130A Rel 2 | | | 2 | 1 (206B) | 2 | FirmElem1 Rel 1 | FirmElem2 Rel 2 (204(2)B) | FirmElem3 Rel 1 | | | |
| 202C   CPU 130A Rel 2 | | 2 (210C) | | 2 | | | | | SoftElem1 Rel 2 (208(1)C) | SoftElem2 Rel 1 | SoftElem3 Rel 1 |
| 202D   CPU 130B Rel 1 | | | | | | | | | | | |
| 202E   Board Rel 1 | | | | | | | | | | | |
| | 200 | 206 | 210 | 212 | 214 | 216 | 204(1) | 204(2) | 204(3) | 208(1) | 208(2) | 208(3) |

Card 100 Rel 1 – 200A

U.S. PATENT DOCUMENTS

| | | | |
|---|---|---|---|
| 2002/0092010 A1* | 7/2002 | Fiske | 717/168 |
| 2002/0124245 A1* | 9/2002 | Maddux et al. | 717/176 |
| 2002/0194313 A1* | 12/2002 | Brannock | 709/220 |
| 2002/0199180 A1* | 12/2002 | Donaldson et al. | 717/178 |
| 2003/0159135 A1* | 8/2003 | Hiller et al. | 717/166 |
| 2004/0199615 A1* | 10/2004 | Philyaw | 709/220 |
| 2004/0205709 A1* | 10/2004 | Hiltgen et al. | 717/115 |
| 2004/0205745 A1* | 10/2004 | Piazza | 717/168 |
| 2004/0210897 A1* | 10/2004 | Brockway et al. | 717/174 |
| 2005/0144614 A1* | 6/2005 | Moslander et al. | 717/168 |
| 2005/0160195 A1* | 7/2005 | Bruner et al. | 710/8 |
| 2005/0193386 A1* | 9/2005 | McCaleb et al. | 717/168 |
| 2005/0257214 A1* | 11/2005 | Moshir et al. | 717/171 |
| 2005/0268296 A1* | 12/2005 | Marolia et al. | 717/168 |
| 2006/0130046 A1* | 6/2006 | O'Neill | 717/168 |

OTHER PUBLICATIONS

Cook, Workstation Upgrade: WinNT to Win2000, Aug. 2000.*

* cited by examiner

| Module | HFCL | HSCL | BHSCL | FSCL | BFSCL | Firmware ID | Firmware ID | Firmware ID | Software ID | Software ID | Software ID |
|---|---|---|---|---|---|---|---|---|---|---|---|
| CPU 130A Rel 1 (202A) | 1 (206A) | 1 | | | | FirmElem1 Rel 1 | FirmElem2 Rel 1 | FirmElem3 Rel 1 | SoftElem1 Rel 1 | SoftElem2 Rel 1 | SoftElem3 Rel 1 |
| CPU 130A Rel 2 (202B) | | | 2 | 1 (206B) | 2 | FirmElem1 Rel 1 | FirmElem2 Rel 2 (204(2)B) | FirmElem3 Rel 1 | | | |
| CPU 130A Rel 2 (202C) | | 2 (210C) | | 2 | | | | | SoftElem1 Rel 2 (208(1)C) | SoftElem2 Rel 1 | SoftElem3 Rel 1 |
| CPU 130B Rel 1 (202D) | | | | | | | | | | | |
| Board Rel 1 (202E) | | | | | | | | | | | |
| 200 | 206 | 210 | 212 | 214 | 216 | 204(1) | 204(2) | 204(3) | 208(1) | 208(2) | 208(3) |

Card 100 Rel 1 – 200A

FIG. 2

SYSTEM AND METHOD FOR MANAGING CONFIGURABLE ELEMENTS OF DEVICES IN A NETWORK ELEMENT AND A NETWORK

FIELD OF THE INVENTION

The invention relates to a system and method for managing the tracking of configurable devices in an electronic device.

BACKGROUND OF INVENTION

It is common for electronic and communication devices to utilize hardware, software and firmware elements to provide aspects of their functionality. The hardware elements may comprise upgradable components such as CPUs, memory modules and other upgradeable and replaceable devices. Firmware stored in non-volatile electronic devices, such as EEPROMs, EPROMs, PLDs and PGAs, and volatile devices such as FPGAs and RAM, provide low level, executable code performing various calculations and operations on input and output signals depending on the program embodied in the firmware. Software, which is frequently stored non-volatile memory, but executes from volatile memory such as RAM, provides an operating code for a program which is executed on a CPU.

After an electric device is tested and released into a product any one of the hardware, software or firmware elements may be independently upgraded on a device. Upgrades may be implemented to an element to correct existing operational errors or to improve its performance. For example, in hardware a "cut and strap" may be added to change an electrical connection on one of its circuits. In software, a new routine may be added providing a new feature for the program. As upgrades are implemented to an element, they are tracked using release codes. A series of release codes document the upgrades history of the element. For a given electronic device, the elements and their associated release codes determine what versions of the hardware, software and firmware are present in the device.

It is possible that for any one element, an upgraded version may not operate with the existing elements on the device thereby requiring upgrades to those elements. For example, a hardware upgrade implemented to a CPU may require that the software and/or the firmware be upgraded. Alternatively, it is possible that the upgraded version of the element may be backwards compatible with the other existing elements, but may not be able to perform its upgraded features without an accompanying upgrade to one of the other elements. For example, an upgraded CPU providing additional D/A conversion facilities may work with the existing firmware and software on a device, but access to the D/A facilities would not be provided without an upgrade to the software. It will be appreciated that other permutations of forward and backward compatibility levels are possible for hardware, software and firmware elements of an electronic device.

Accordingly, there is a need for a system and method for tracking the compatibility of various versions of hardware, software and firmware associated with an electronic device or a system of electronic devices.

SUMMARY OF INVENTION

In a first aspect, a method of selecting a version of a program code from a series of program codes for a program element associated with a hardware element for a circuit board is provided. The hardware element can be implemented in many versions. The method identifies a particular program code from the program codes which is compatible with a particular hardware element of the hardware element versions on the circuit board, selects from a group of the program codes a selected program code matching the particular program code, and loads the program storage element with the selected program code.

The method may have information regarding the particular program code stored with the circuit board, the program codes stored in a program code bundle and the selected program code is identified by accessing a list. The list has an entry for each of the hardware element versions, with each entry having a reference to a compatible program code which can operate with the entry.

The method may have each program code being a firmware program.

The method may have a software program being associated with the program code bundle and being associated with the hardware element.

The method may have each entry in the list further associated with a list of earlier versions of each program code with which the hardware element is compatible.

The method may have each entry in the list further associated with a list of earlier versions of the software program with which the hardware element is compatible.

In a second aspect, a system for processing program updates associated with a hardware element is provided. The hardware element can be implemented in several versions. The hardware element is associated with a circuit board. The system comprises a record of the hardware element versions, each entry in the record being associated with a compatible program code from a set of program codes, a second record associated with the circuit board, the second record identifying a particular program code which is compatible with an installed hardware element version of the hardware element on the circuit board, a bundle of executeable program codes from a group of the program codes and a program code loader. The loader can access the record and the second record to identify a suitable program code from the plurality of program codes for the installed hardware element version, locate the suitable program code in the bundle, and effect transfer of the suitable program code from the bundle to a storage device. The storage device can receive the suitable code and is associated with the installed hardware element version and the circuit board.

The system may have the program code as being a firmware program.

The system may have a software program associated with the program code bundle and with the hardware element.

The system may have each the entry in the record being further associated with a compatible software program.

The system may have each entry in the record being further associated with a list of earlier versions of each program element with which the hardware element is compatible.

The system may have each entry in the record being further associated with a list of earlier versions of the software program with which the hardware element is compatible.

In a third aspect, a method for updating a program code from a series of program codes for a hardware element is provided for a circuit board. The hardware element may be implemented in a series of versions. The method comprises identifying a particular program code which is compatible with a particular hardware element on the circuit board, selecting from a group of program codes a selected program code matching the particular program code, and transferring the suitable program code from the group of program codes to a storage device. The storage device can receive the suitable code and is associated with the particular hardware element and the circuit board.

The method may further utilize information regarding the particular program code is stored with the circuit board, may have the program codes stored in a program code bundle, and may have the selected program, code identified by accessing a list. The list may comprise an entry for each hardware element version, with each entry in the list being associated with a reference to a compatible program code which can operate with the entry.

The method may have each of the program codes being a firmware program.

The method may have a software program associated with the program code bundle and associated with the hardware element.

The method may have each entry is the list being further associated with a list of earlier versions of each program code with which the hardware element is compatible.

The method may have each entry in the list being further associated with a list of earlier versions of the software program with which the hardware element is compatible.

In a fourth aspect, a method of selecting a version of a firmware code for a programmable firmware element associated with a hardware element for a circuit board is provided. The hardware element may be implemented in a series of versions; the hardware element may further be associated with a software code. The method comprises identifying a particular version of the hardware element versions which is associated with the circuit board, identifying a particular firmware code which is compatible with a particular hardware element on the circuit board, selecting from a group of firmware codes a selected firmware code matching the particular firmware code, associating a software code with the group of firmware codes, loading the firmware element with the selected firmware code, and checking compatibility of operation of the software code with the selected firmware code and the particular version of the plurality of hardware element versions. In doing so, the method select the selected firmware code independently of installation of the software code.

In a fifth aspect, a method of evaluating compatibility of a hardware element in a circuit card with a program code is provided. The hardware element may be implemented in a series of versions. The program code may be implemented in a series of versions. The method comprises identifying a particular hardware element version which is associated with the circuit board, identifying a particular program which is associated with the hardware element, evaluating whether the particular program code is compatible with the particular hardware element version and indicating whether the particular program code is compatible with the particular hardware element version.

The method may have information regarding the particular program code identified by accessing a list. The list may have an entry for each of the hardware element version. Each entry in the list may have a reference to a compatible program code which can operate therewith.

The method may have each program code being a firmware code.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2 is a table providing a compatibility matrix of software and firmware codes associated with hardware elements of the circuit card of FIG. 1;

DETAILED DESCRIPTION OF THE EMBODIMENTS

Figure 1:
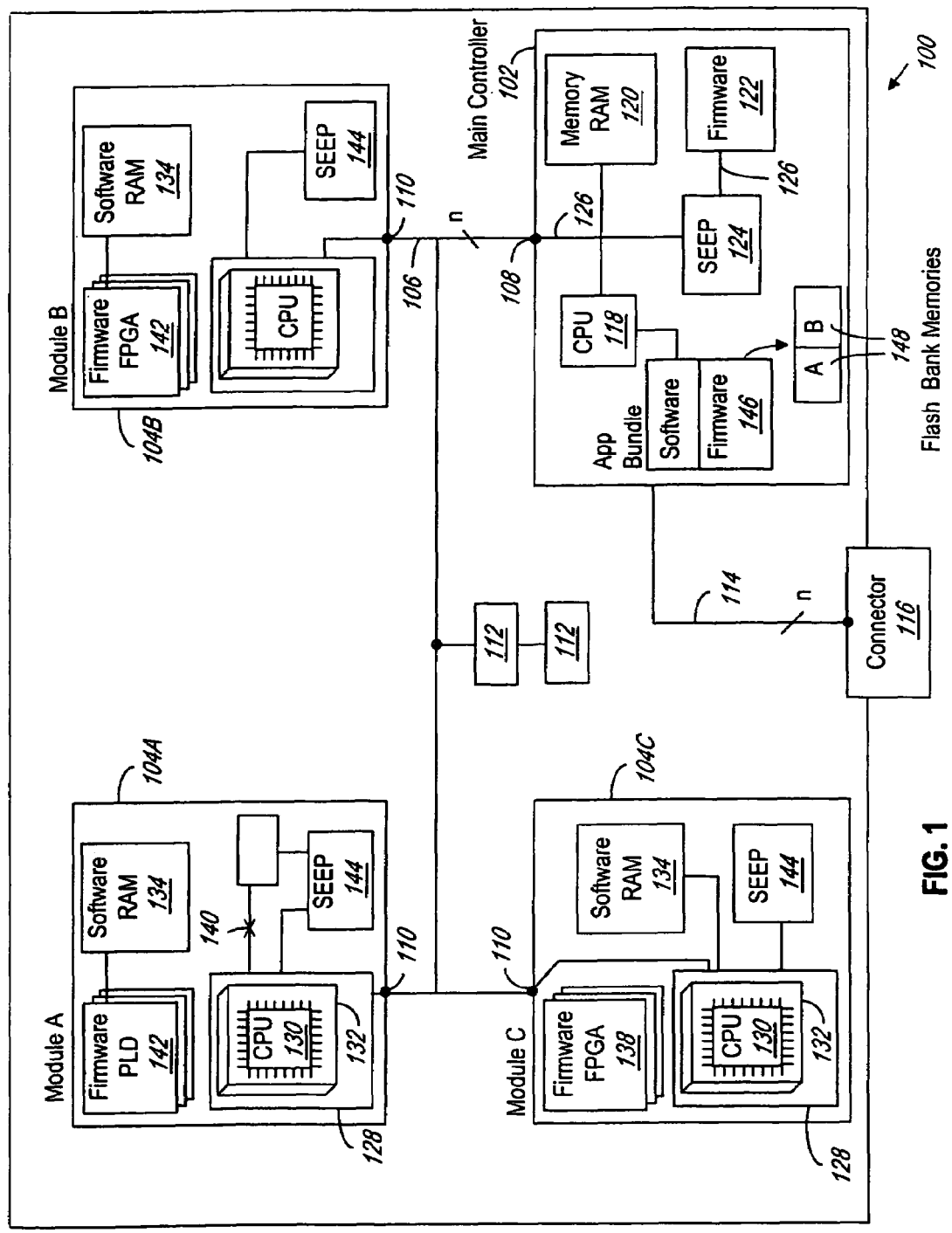
FIG. 1 is a block diagram of hardware elements of a circuit card of an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Basic Features of System

The following is a description of an electronic system associated with an embodiment.

Referring to FIG. 1, electronic circuit card 100 is shown. Circuit card 100 has various electronic modules which operate to provide manipulation and production of various electronic signals, including main controller 102 and modules 104a, 104b and 104c. Controller 102 communicates with modules 104 through electronic connections 106 in card 100. The interface point between controller 102 and connections 106 is shown as node 108. Similarly, the interface between connections 106 and each of modules 104 is shown as nodes 110. Other devices 112 may also be connected either directly or indirectly to connections 106 thereby allowing them to communicate with either controller 102 or modules 104. As shown, an additional set of connections 114 is provided from main controller 102 to an external connector 116, thereby allowing circuit card 100 to be associated with other external devices (not shown). Each of connections 106 and 114 may comprise n separate electrical tracks for carrying signals between controller 102 and modules 104.

Controller 102 provides the main controlling system for modules 104. On controller card 102 there is CPU 118, RAM 120, firmware devices 122 and non-volatile memory 124. It will be appreciated that there may be several of any of the elements on main controller 102. For the shown implementation, RAM 120 stores an operating program which is executed on CPU 118. Firmware devices 122 are programmable, each having separate program codes. Non-volatile memory 124 is also programmable and stores configuration information about controller card 102. Non-volatile memory device 124 can be implemented as a Serial Electrically Erasable PROM (SEEP) and is used to store local configuration information relating to the hardware, software and firmware elements in module 104. It acts as a virtual label for the contents of the module 104. Further detail on the contents of SEEP 124 are provided below. Internal connections 126 provide an electrical connection between the elements of controller 102 and interface node 108.

Generally, each of modules 104 comprises the following hardware, software and firmware elements. Hardware element 128, abstractly, is an upgradable component, and is shown as local CPU 130. In an embodiment, CPU 130 is mounted directly to module 104 in order to dissuade switch operators from making their own modifications to module 104. However in another embodiment, CPU 130 is mounted in a socket 132 which provides a releasable interface for the electrical contact points of CPU 130 to other components in modules 104. Socket 132 may comprise a zero-insertion force ("ZIF") socket, known in the art. Accordingly, with socket 132, CPU 130 may be removed and replaced with an upgraded component. Also, an upgrade on hardware element 128 may be a physical modification, such as a "cut and strap" made to electronic tracks on the module, shown as modification 140. The software element 134 is an executable program code stored in a volatile program storage element, or memory device, such as RAM, and is controlled by an aspect of the hardware element 128. For the example, the software element is stored in local RAM 136 and operates on CPU 130. Software, as is known, frequently undergoes revisions and has to be installed into a released circuit card 100. The firmware elements 138 are executeable program codes and are provided in a number of program storage elements, including programmable volatile and non-volatile devices such as PLDs, FPGAs and other devices 142. Each of the firmware elements 138 may utilize different program codes. As with software elements, for firmware elements 138 often are upgraded, which occasionally have to be installed into an existing circuit card 100. An electronic signature containing information on the hardware elements 128 on module 104 is stored in SEEP 144. Further detail on the use of the electronic signature and the configuration information in SEEPs 124 and 144 are provided later. It will be appreciated that other modules 104 may not have all of the hardware, software and firmware elements.

As described earlier, it is possible that for card 100, an upgraded hardware element 128 may not be compatible with the installed software elements 134 and firmware elements 138. Card 100 may not be able to implement the features of the upgraded hardware element 128 without other upgrades to other software and firmware elements 138. Alternatively, the upgraded hardware element 128 may cause card 100 to malfunction without other upgrades. Alternatively still, an upgraded hardware, software or firmware element may be fully compatible with the existing other elements.

In the embodiment, a set of compatible firmware elements 138 which can operate with a particular version of a software element 134 are bundled together into program bundle, referred to as an application bundle 146. The application bundle is stored in a flash bank of memory 148. In the embodiment, there is an active flash bank 148 and an inactive flash bank 148. The operating firmware and software elements are stored in the active flash bank 148 and new downloads are stored in the inactive flash bank 148. Once the new download is verified, the embodiment can switch between the active and inactive flash banks 148. Accordingly, when the particular software element 134 is provided to main module 104, the embodiment has the ability of selecting the most appropriate set of firmware elements 138 for that particular software element 134. In the embodiment, each software element 134 has a record, which is accessible by other elements (such as a firmware loader, described later) of firmware elements 138 and hardware elements 128 which will operate with it.

Referring to FIG. 2, the embodiment provides a system and method for tracking compatible software elements 134 and firmware elements 138 for a particular hardware element 128 on card 100. Matrix 200 is used to track this information. The matrix 200 tracks hardware elements 128 of card 100, which, when they are upgraded, require a change to the existing firmware elements 138 and/or software elements 134 and it provides for a hardware element 128 a record of compatible firmware elements 138 and software elements 134 for each upgrade. Field 200A provides a marker for the version of the matrix stored for a given set of hardware elements 128. For the example, the version of matrix 200 is "Card 100 Rel 1". Matrix 200 is stored at a centrally accessible location, such as in flash memory 148 on main controller 102. The data format of matrix 200 may comprise any machine readable format, including an ASCII file, a spreadsheet file or a coded binary file. Accordingly, main controller 102 has access to data indicating the hardware/firmware/software element compatibilities for itself and its associated modules 104.

In matrix 200, a row entry is provided for a particular hardware element 128. Fields in the row provide information about its current set of compatible firmware elements 138 and software elements 134. The row also contains information on the compatibility of firmware and software elements with each other. In describing the rows and columns of matrix 200, first a description is provided of the relationship between a hardware element 128 and its affected firmware elements 138. Next, a description is provided of the relationship between a hardware element 128 and its affected software elements 134. Finally, a description is provided for the relationship between a firmware element 138 and its affected software elements 134.

In matrix 200, for a hardware element 128 listed in a row, entries in column 202 of the row identify hardware elements 128 for the module 104 which affect firmware elements 138 and software elements 134. As an example, entries 202A, 202B and 202C relate to a first CPU, such as CPU 130A, on card 100 "CPU A", versions "Rel 1" and "Rel 2"; entry 202D related to a second CPU, such as CPU 130B, "CPU B", having "Rel 1"; entry 202E relates to the card 100 itself, as "cut and strap" revisions may be made to the card itself such as modification 140.

For the hardware/firmware element relationships, for each hardware element 128 identified in row 202, a list of firmware elements 138 whose ability to function are affected by the upgrade to that hardware element 128 is provided in entries in the corresponding set of columns 204. Each entry in set of columns 204 is a reference number and version number for a particular firmware download for the affected firmware element 138. Accordingly for the example in set of columns 204, three firmware downloads are identified relating to the first CPU. They are identified as "FirmElem1 Rel1" in column 204A(1), "FirmElem2 Rel1" in column 204A(2) and "FirmElem3 Rel1" in column 204A(3); each firmware download is the latest version of each firmware element which is compatible with that upgraded version of that hardware element 128 in entry 202A.

Entries in matrix 200 indicate the compatibility levels for each upgradeable hardware element 128 vis-à-vis firmware elements 138. A Hardware/Firmware Compatibility Level (HFCL) entry is provided for each upgraded hardware element 128 in matrix 200. The entry in the HFCL field 206 tracks a release level of sets of firmware elements 138 (listed in sets of columns 204) which are compatible with that version of the hardware element 128. In the embodiment, an integer is used as a value to track release levels. A base hardware element 128 is provided with a HFCL value of "1" for its initial set of firmware elements 138. Accordingly, for entry 202A, the initial HFCL value in field 206A is "1". When an upgrade is made to the hardware element 128 which would make any firmware elements 138 incompatible with the upgraded hardware element 128, a new row entry 202B is added for the hardware element 128. In the new row 202B, the HFCL value in field 206 is incremented and a new set of compatible firmware elements 138 is provided in another row entry in set of columns 204. For example, if hardware element 128 is a new CPU 130A requiring a new firmware element for "FirmElem2", new row 202B is added. Entry 200B provides the details of the new hardware element 128, namely "CPU 130A Rel2". HFCL field 206B is set to "2". Also, the affected firmware element 138 is updated in field 204B(2), as shown where, "FirmElem2 Rel2" replaces "FirmElem2 Rel1". If multiple firmware elements 138 are affected by the upgrade to the hardware element 128 and the members in the set of changes are compatible with each other, then the set of changes may be implemented in one new row. Otherwise, multiple firmware element 138 updates which are not compatible with each other would be made in separate new row entries, with each new row entry having the same HFCL value. However, the new row entries will have different FSCL values, described later.

When a change is made to a hardware element 128, the hardware element 128 upgrade and its effect(s) on the listed firmware elements 138 in matrix 200 must be recognized by some manner and then matrix 200 must be updated accordingly. For the present embodiment, upgrades to hardware elements 128 and their effect(s) on firmware elements 138 are tracked by design personnel responsible for designing and maintaining hardware elements 128. The personnel also update records in the SEEP, and the records of compatible elements in the software elements 134. Accordingly, the embodiment takes advantage of the previously tested and verified sets of compatabilities amongst the hardware elements 128, software elements 134 and firmware elements 138. The personnel are also responsible for making the appropriate updates to matrix 200. However, once the matrix 200 is updated, the embodiment provides an automated system which uses matrix 200 to download appropriate firmware elements 138 used with the hardware elements 128.

As with the HFCL entries 206, entries in matrix 200 indicate the compatibility levels for each upgradeable hardware element 128 vis-à-vis a particular version of a software element 134. In an embodiment a Hardware/Software Compatibility Level (HSCL) entry is provided for each upgraded hardware element 128 in matrix 200. The entry in the HSCL field 210 tracks a release level of a particular software element 134 which is compatible with that version of the hardware element 128. In the embodiment, an integer is used as a value to track release levels. A base hardware element 128 is provided with a HSCL value of "1" for its initial set of software elements. Accordingly, for entry 202A, the initial HSCL value in field 208A is "1". When an upgrade is made to the hardware element 128 which would make the particular software element 134 incompatible with the upgraded hardware element 128, a new row entry 202 is added for the hardware element 128. In the new row 202, the HSCL value in field 210 is incremented. The HSCL value is stored as a record in the software element 134, which is accessible by the firmware loader.

In another embodiment the matrix 200 is used to track hardware/software element relationships. Typically, the software elements tracked are smaller sections of executable code, like device drivers and installation code. Therein, for each hardware element 128 identified in row 202, a list of software elements 134 whose ability to function are affected by the upgrade to that hardware element 128 is provided in entries in the corresponding set of columns 208. Each entry in set of columns 208 is a reference number and version number for a particular software download for the affected software element 134. Accordingly for the example in set of columns 208, three software downloads are identified relating to the first CPU. They are identified as "SoftElem1 Rel1" in column 208A(1), "SoftElem2 Rel2" in column 208A(2) and "SoftElem3 Rel1" in column 208A(3); each software download is the latest version of each software element 134 which is compatible with that upgrade version of that hardware element 128 in entry 202A. For example, if hardware element 128 is a new CPU requiring a new software element 134 for "SoftElem1", new row 202C is added. Entry 200C provides the details of the new hardware element 128, namely "CPU 130A Rel3". HSCL field 210C is set to "2". Also, the affected software element 134 is updated in field 208(1)C, as shown where, "SoftElem1 Rel2" replaces "SoftElem1 Rel1". It will be appreciated that if multiple software elements 134 are affected by the upgrade to the hardware element 128, then multiple software element 134 updates would be made in the set of columns 208. If the elements of the set of changes are compatible with each other, then one new row 202 would be added. Again, upgrades and their effects are tracked and entered manually by design personnel.

It will be appreciated that the compatibility of software elements 134 to a particular hardware element 128 is generally independent of the compatibility of that hardware element 128 to its affected firmware elements 138. Accordingly, the values in HFCL field 206 and HSCL field 210 do not necessarily correlate to each other for a given hardware element 128.

In addition to mapping current compatibilities with a hardware element 128 and a software element, a Backward Hardware/Software Compatibility Level (BHSCL) entry in field 212 provides a record of which older software elements 134 are compatible with the current hardware element 128. When a hardware element 128 is upgraded and the previous set of software elements 134 becomes incompatible with the upgraded hardware element 128, the BHSCL value in field 212 is set to the current value of the HSCL from field 210. This indicates that there is no backward compatibility between the current hardware element 128 listed in row 202 with previous software elements 134. However, when an upgrade to hardware element 128 is made, causing a new row 202 to be added, and the upgraded entry in new row 202 can operate the current software elements 134, the BHSCL value in field 212 for that new row contains a list of all earlier HSCL values in fields 210 from earlier rows 202 for earlier versions of that hardware element 128 that can operate on the upgraded hardware element 128. For example, if hardware element 128 in row 202B cannot operate the software elements related to CPU version of 202A, then the BHSCL for 202C is "2". Further, if hardware element 128 in row 202C can operate the software elements related to CPU version of 202B, then the BHSCL for 202C is "2". It will be appreciated that other indices may be used in BHSCL field 212 to track compatibilities.

To use the values of the BHSCL field, the firmware loader examines the records in the software element 134 containing the list of its compatible hardware elements 128 and firmware elements 138. If the HSCL value and the FSCL value retrieved from records accessible in software element 134 do not match the values in the matrix 200, then the BHSCL and BFSCL values are accessed to locate a next best compatible set of software elements 134 and firmware elements 138. As the changes are tracked separately by the design personnel it will be assured that when they perform the updates to the SEEP 142, software element 134 records and matrix 200, a match will be provided between the given software element 134 and a set of firmware elements 138 and a hardware element 128.

For each set of firmware elements 138, a Firmware/Software Compatibility Level (FSCL) field in column 214 entry indicates the compatibility level of a software element 134 to a set of firmware elements 138. The value of an entry in column 214 is derived from the HFCL value 206 and the corresponding set of software elements 134 for a given entry in row 202. It will be appreciated that for a given HFCL value in field 206 and a given HSCL value in field 210, there may be multiple FSCL entries in column 214 wherein each entry has a row 202 in matrix 200. For each FSCL entry in column 214, its associated set of firmware elements 138 are provided in set of columns 204. Accordingly, using matrix 200 a set of firmware elements 138 can be identified which are compatible with a given software element 134. This value is also stored in a record in software element 134 which can be accessed by the firmware loader.

When an upgraded set of firmware elements 138 is not compatible with a current set of software elements 134, matrix 200 can be accessed to identify a compatible set of firmware elements 138 for the current set of software elements 134. This is accomplished by the firmware loader which accesses the FSCL values stored in the records of the software element 128 and matches it with the "best fitting" FSCL entry in matrix 200. The corresponding set of firmware elements for the row entry of the "best fitting" FSCL entry are downloaded. If there is not match, then a new application bundle 144 is required; one which contains the appropriate set of firmware elements 138 for that software element 134.

Entries in Backward Firmware/Software Compatibility Level (BFSCL) field 216 provide tracking of backward compatibility between the current set of firmware elements 138 for a hardware element 128 in a row 202 and older sets of software elements 134 associated with other rows 202. For a given hardware element 128 in a given row 202, if its associated set of firmware elements 138 is not compatible with older sets of software elements 134, then the value in BFSCL field 216 is set to the current value in the FSCL field 214, which appears in that row 202. Where the current set of firmware elements 138 is compatible with older sets of software elements 134, as well as the current set of software elements, the value of the BFSCL field 216 contains a list of all values of FSCL fields 214 that the firmware elements 138 share compatibility.

The embodiment also tracks changes made to firmware elements 138 and software elements 134 which do not affect the functionality of the existing levels of hardware elements 128. For example, a change may be made to a software element 134 to correct an internal error which affects nothing else. To track these changes, a new version of the software element 134 is used. In the new matrix version, a new version value in field 200A in entered and each entry for amended software element 134 (or firmware element 138) is updated to its new version. For example, if a software element 138 "SoftElem3" in column 208(3) is upgraded to "SoftElem3 Rev2" and the upgrade did not affect any other elements, then new software element SoftElem3 Rev2'. Also, new matrix 200' is created with identical entries to matrix 200, except that each entry for "SoftElem3" in column 208(3) is changed to SoftElem3 Rev 2. A similar revision to matrix 200 and its elements would be made for internal revisions made to firmware elements 138. It will be appreciated that historical data in older matrices 200 may be stored in archives.

For a given module 104, using matrix 200 and data on hardware elements 128 currently installed on module 104, the embodiment provides information enabling the hardware element 128 to be upgraded with its most current firmware elements 138 and software elements 134 or alternatively, to be loaded with a compatible set of firmware elements 138 and software elements 134. The embodiment allows the firmware elements 138 and software elements 134 to be upgraded independently of each other.

Referring to FIG. 1, as indicated earlier, for a given hardware element 128, numerous sets of differing firmware elements 138 and software elements 134 can be associated with it, providing current and backward operational compatibility. In order to track the sets of firmware and software element downloads, the embodiment groups together a set of firmware elements 138 with a set of compatible software elements 134 into an application bundle 146. A group of application bundles 146 may be stored at a central location, such as a server or an FTP site, or they may be stored on a CD ROM. In the embodiment, application bundles 146 are stored in flash banks 148 or some non-volatile memory located either on the card 100 or in an external module or SEEPs 142 of memory in the main controller 102. Once an appropriate application bundle 146 is identified for a given hardware element 128, the application bundle 146 can be downloaded into the programming system relating to the hardware element 128 and the associated devices for the firmware and software elements can be installed onto the local firmware and software elements. A unique identifier associated with each application bundle 146, in order to track the bundles 146.

To download an appropriate application bundle 146, the embodiment needs to identify the target application bundle 146 containing the target software element 134 and the target firmware element 138. The flash banks 148 provide a main and an alternate set of storage devices allowing a downloaded application bundle 146 to be tested and configured on the alternate set of storage devices before switching over operation of the system to the downloaded set of firmware and software elements on the next reset of the system.

In order to identity the appropriate configuration for a given hardware element 128 in a given hardware module 104 for the application bundle 146, it is necessary to have information regarding the configuration of the target hardware element 128. Accordingly, configuration information about hardware elements 128 for a given module 104 is stored in SEEP 144. The SEEP stores data from the current HFCL field 206 and HSCL field 210 for the hardware element 128, thereby providing information on firmware and software compatibilities with the present hardware elements 128.

Further detail on the application bundle 146 is provided. Application bundle 146 comprises one software element 134, a firmware loader and a set of all possible firmware element 138 loads for that software element 134.

The firmware loader is the interface between the application bundle 146 and the hardware element 128. The firmware loader is a software program which loads the firmware elements 138 into their respective memory devices 142. Upon activation, the firmware loader examines the configuration information for the hardware elements 128 on each card. Accordingly, the firmware loader obtains the values of the HFCLs for each hardware element 128 of each module 104. In order to identify the current set of firmware elements 138 which are the most current set for the hardware element 128, the loader utilizes the HFCL value for the hardware element 128, which is stored locally on module 104 in its SEEP 144. As described above, the HFCL value provides an ordinal marker to a level of firmware elements 138 for a hardware element 128. In order to provide the list of firmware elements 138 relating to the HFCL value, the application bundle 146 has access to a look-up table comprising a list of HFCL values for that hardware element 128 and for each value, a corresponding list of firmware element downloads. This look-up table is derived from value in columns 202, 206 and 204 of matrix 200. If a different version of a software element exists, then another application bundle 146 is made for it.

Based on the information in SEEP 144, the loader accesses matrix 200 and determines whether or not the hardware element 128 has the proper firmware and software elements. For firmware element 138 upgrades, if the proper firmware element 138 loads are available, the loader will transfer all the downloads for the firmware elements 138 to their devices. If the proper firmware elements 138 are not available, an error message is generated. For example, an error would be generated if the loader does not have any entries in its matrix 200 for the HFCL for a given hardware module 104. In this case, the download would fail and the application bundle 146 would be discarded.

With the matrix 200, the application bundle 146 and the data in SEEP 144, the embodiment can download firmware and software elements into a module 104. Following is a description of a downloading method used by the embodiment.

Figure 3:
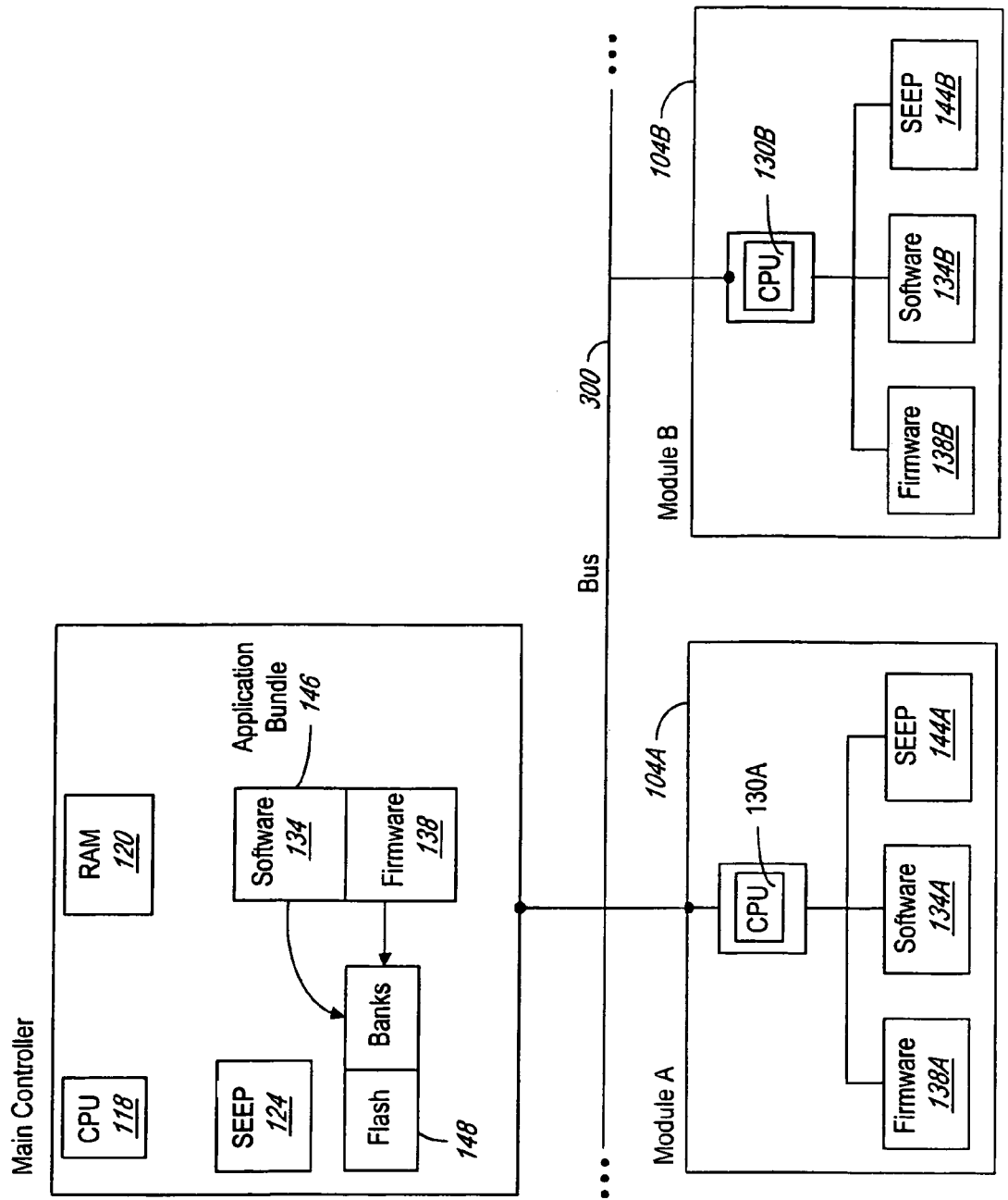
FIG. 3 is a block diagram of hardware elements of a main controller card communicating with modules via a bus of another embodiment of the invention.

Referring to FIG. 3, controller 302 is shown connected via bus 300 to modules 304a and 304b. Bus 300 may comprise an Ethernet link, an optical link or other communication technologies known in the art. In the same manner as in the circuit card 100 where main controller 302 is able to download sets of firmware and software elements to each of its modules 104, main controller 302 can download to its modules 304 over bus 300 the correct download information. It will be appreciated that information from each local SEEP must be transmitted via the protocol used by bus 300 to the main controller. And main controller 302 must transmit the appropriate application bundle 146 over bus 300 to each module 304a and b.

Figure 4:
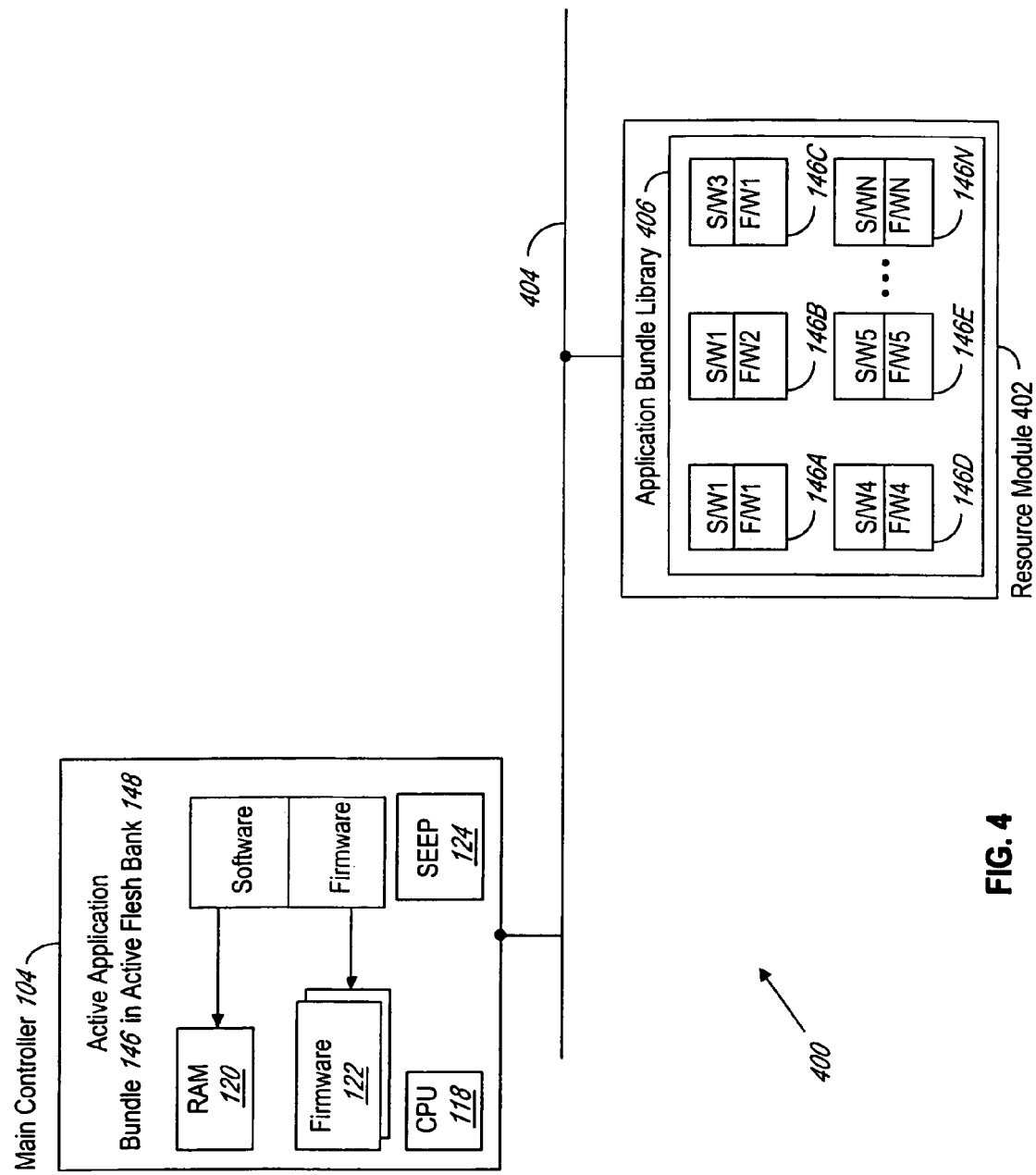
FIG. 4 is a block diagram of a resource module associated with the main controller card of the embodiment shown in FIG. 3.

Referring to FIGS. 1 and 4, following is an example of an illustrative download system 400 for an embodiment. Therein, resource module 402 is connected via a communication link 404 to main controller 104. Resource module 402 comprises an application bundle library 406, which contain a series of application bundles 146A . . . 146N for many hardware elements 128, as described earlier. Each application bundle 146 has one software element 134 associated with a set of firmware elements 138. The same software element 134 may be associated with several different sets of firmware elements 138 in different bundles. The operator of main controller 104 selects the resource module 402 from which the firmware elements 138 and/or software elements 134 are to be downloaded. As described earlier resource module 402 may be a CD-ROM, and FTP site, a web server or other known data sources. Next, the operator selects the desired application bundle 146 from the resource module 402. This is controlled by download software which can interface with the operator and module 104. Next, one of the flash banks 148 in module 104 which is to receive the application bundle 146 is selected. Generally, the flash bank 148 which is selected is the non-operational flash bank, i.e. the current firmware and software elements are provided from the current flash bank 148. The new application bundle is downloaded to the inactive flash bank.

After the download of the application bundle 146 is completed to the selected flash bank 148, it is verified using a checksum associated with the application bundle 146 and validation of the application bundle identification number. Second, the firmware loader and its loads are verified. This verification process may simulate or even operate the firmware loader to determine if the loader can generate proper loads for the firmware build without error.

As noted earlier, the firmware loader can access the values of the HFCLs in SEEP 144 and utilizes this information and its internal matrix 200 to determine whether the appropriate firmware element 138 downloads are installed on the module 104. If not, the download in the bank 148 is erased.

If the loader recognizes all the cards and their HFCLs and has the appropriate loads for the cards and recognizes all of the cards HSCL and can properly process them and recognize the FSCLs generated for this hardware and can properly process them the verification process is complete and successful.

Upon successful completion of the download, the operator selects the flash bank 148 to be made active and the new application bundle 146 is activated.

Volatile devices are downloaded with their program elements. These devices must have their downloads reinstalled every time card 100 is reset. The firmware elements 138 for the non-volatile devices are loaded by the firmware loader from a new bank 120 when the firmware loader determines that the firmware element must be upgraded. In the embodiment, the firmware elements 138 are derived from JEDEC files.

After all firmware elements 138 have been downloaded, the firmware loader processes the software element 134 download. The software element 134 download may be an upgraded version of the software element 134. The software element 134 can read and use values of the HSCL and FSCL in SEEP 144. For example, after obtaining the HSCL and FSCL values, the software element 134 may select one of several predefined values for variables for an equation. This may occur when the equation is based on values produced from a particular upgradeable hardware element 128, such as a resistor. For the given hardware element 128, the software element 134 requires the values of the HSCL and the FSCL in order to determine the compatibility of the software element 134 with the existing other elements. The firmware loader queries the software element load for a list of all HSCLs that the software element 134 recognizes. From the information stored in the matrix 200, the firmware loader can determine which of the HSCLs to return to the software element 134 for this module 104. This is done by analyzing the BHSCL value stored in the matrix 200. If the change to hardware element 128 does not create an incompatibility issue with the old software element 134, then the old software element 134 is allowed to continue to function. This interface is required, as if a new HSCL value were provided directly to old software element 134, then the old software element 134 would not recognize the new HSCL. Therefore the software element 134 would halt and advise the operator either to upgrade the software element (or downgrade the hardware element 128). Where an old software element 134 may function properly with a new hardware element 128, then only a new loader is issued which translates the new HSCL stored in the new hardware element 128 into a value that the old software element 134 recognizes.

As noted above, the BHSCL contains a list of all HSCL values with which the current HSCL is compatible. If the BHSCL does not have a value which equals the HSCL for a given module and a value of HSCL, then there is backward compatibility. For example, if the value in the SEEP were 5 and 3, then according to the table an HSCL having a value of 5 is compatible with and HSCL of 4 and 2, but not 1, 3 or 0. The values of 5, 4 and 2 are then compared to the values passed to the firmware loader by the software element 134 load. The most significant matching value, if any, would be used to pass back to the software element as the HSCL value.

This process is repeated until all module levels have been resolved and an HSCL value has been passed to the software element for each module. Similarly, the same process is repeated to establish an acceptable FSCL for each software for each module.

For a given HFCL and HSCL there may be multiple FSCL entries each having a new row in the matrix 200. Each of the multiple FSCL values would have its own row in the matrix 200 and could have its own set of routines within the software element 134 associated with the application bundle 146. This would allow a software element to negotiate a compatible set of firmware element 138 loads. This would allow firmware element changes that are incompatible with an old software element 134 to be bypassed, allowing old software element 134 to still function, albeit without the latest set of firmware element 138 versions.

It will be appreciated that the embodiment provides the ability of determining whether a software element 134 is compatible with an installed target hardware element 128. This is achieved by accessing and comparing the values in the HSCL and HFCL values stored in the SEEP 144 associated with the target hardware element 128. The values in the SEEP 144 are compared against the values in the matrix 200 in the application bundle 146 associated with the particular software element 134. If the comparison indicates that there is a match, then the software element 134 is compatible with the target hardware element 128. If the comparison indicates that there is no match, the embodiment may notify the operator of the switch of the mismatch via an appropriate error message.

Figure 5:
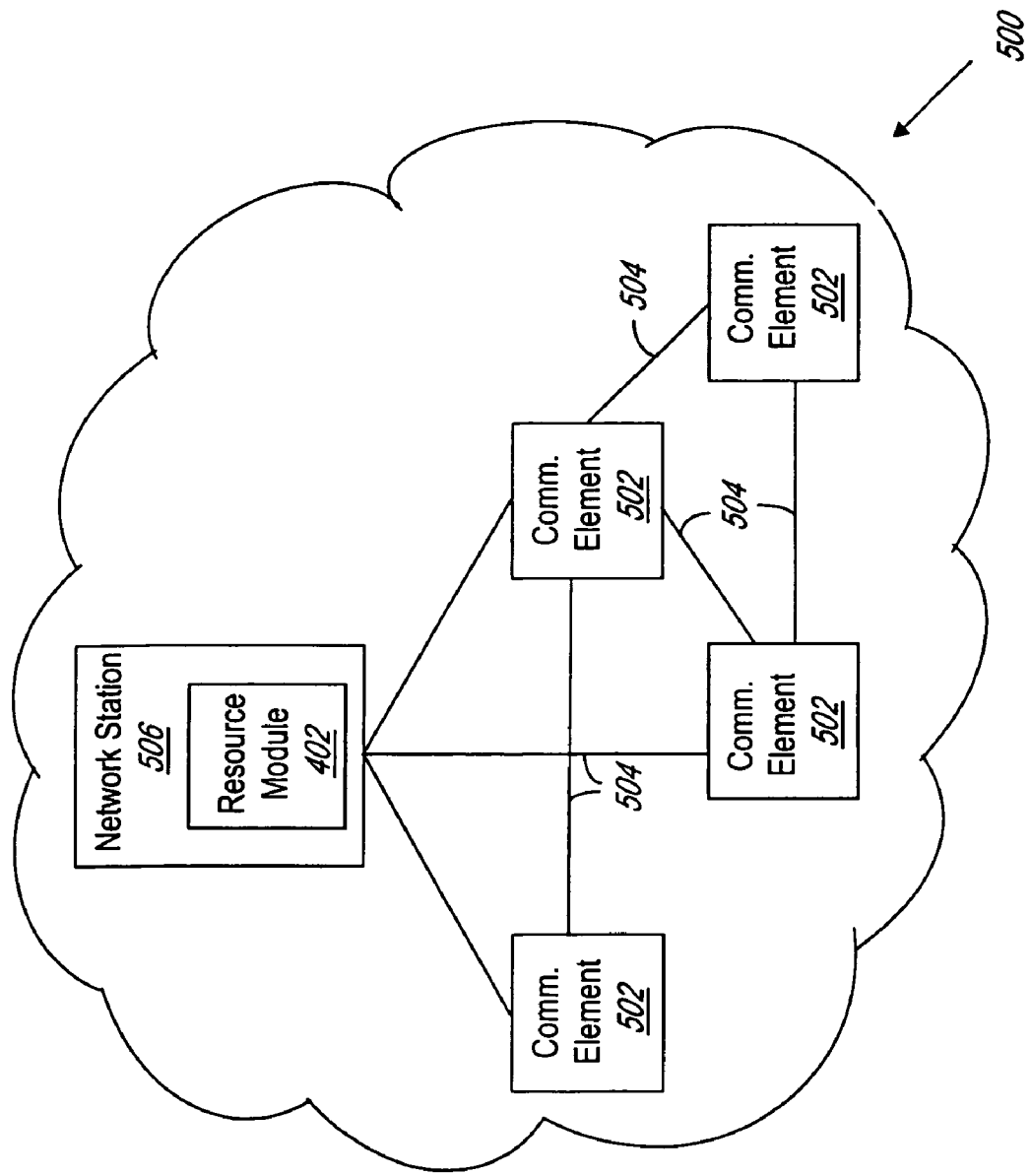
FIG. 5 is a block diagram a network of modules communicating with a resource module of yet another embodiment of the invention.

Referring to FIG. 5, another embodiment is shown relating to network 500. Network 500 comprises a series of communication elements 502 which are connected together via links 504. A network station 506 provides overall control and configuration of communication elements 502 and thereby the operation of network 500.

Communication elements 502 comprise various hardware, software and firmware elements. Network station 506 contains resource module 402. Resource module 402 contains the application bundle library 406 which contains the application bundles 146A . . . 146N. Downloads of application bundles 146 to any of communication elements 502 are effected from network station 506 by software operating thereon following the procedure described above for FIGS. 1-4. It will be appreciated that other download methods may also be used.

From the above description, it will be appreciated that the embodiment provides a centralized system for tracking independently compatibilities for firmware and software elements which are affected or affect the operation of hardware elements in electronic circuits. The tracking system is also used as a component in a downloading system for the firmware and software elements.

It will further be appreciated that in other embodiments, the system and method of tracking firmware elements 138 and software elements 134 may be reversed from the embodiment described above.

It is noted that those skilled in the art will appreciate that various modifications of detail may be made to the present embodiment, all of which would come within the scope of the invention.

We claim:

1. A method for updating software and firmware operating with hardware located in a main controller device and at least one associated module device in communication therewith, said method comprising:

receiving at the main controller device an updated application bundle, the updated application bundle having an updated software element, a set of firmware elements relating to the updated software element, and a firmware loader for loading the firmware elements relating to the updated software element;

determining whether the updated application bundle is operable with a hardware element of the main controller device and the at least one associated module device;

installing the updated application bundle in the main controller device and the at least one associated module device if the updated application bundle can be operated with the hardware element; and, utilizing an existing application bundle at the main controller device and the at least one associated module device if the updated application bundle cannot be operated with the hardware element;

wherein the determining whether the updated application bundle is operable with the hardware element includes:

storing a hardware/software compatibility level value and a hardware/firmware compatibility level value on the main controller device and the at least one associated module device;

retrieving the hardware/software compatibility level value and the hardware/firmware compatibility level value with the firmware loader; and, searching a matrix with the firmware loader using the hardware/software compatibility level value and the hardware/firmware compatibility level value to determine whether a version of the software element and a version of the firmware elements provided in the updated application bundle are compatible with the hardware element, the matrix listing versions of the software elements compatible with the hardware element for the hardware/software compatibility level value and versions of the firmware elements compatible with the hardware element for the hardware/firmware compatibility level value.

2. The method of claim 1, wherein:
the main controller device controls the at least one associated module device;
the installing of the updated application bundle in the main controller device is performed remotely; and,
the installing of the updated application bundle in the at least one associated module is performed by the main controller device.

3. The method of claim 1, wherein the matrix is stored remotely from the main controller device and the at least one associated module device.

4. The method of claim 3, wherein the matrix is accessible by the main controller device.

5. The method of claim 1, wherein the existing application bundle includes an existing software element, a set of firmware elements relating to the existing software element, and a firmware loader for loading the firmware elements relating to the existing software element.

6. The method of claim 1, wherein the updated application bundle and the existing application bundle are stored in the main controller device.

7. The method of claim 1, wherein:
the receiving at the main controller device of updated application bundle includes storing the updated application bundle in a memory bank at the main controller device having an inactive status; and,
the existing application bundle for the main controller device is stored in a memory bank at the main controller device having an active status.

8. The method of claim 7, wherein the installing of the updated application bundle includes:
exchanging the inactive status of the memory bank storing the updated application bundle for the active status of the memory bank storing the existing application bundle;
downloading to the at least one associated module device the updated application bundle from the memory bank storing the updated application bundle; and,
utilizing the updated application bundle instead of the existing application bundle for the main controller device and the at least one module device.

9. The method of claim 1, wherein the updated application is received from a library of application bundles stored external to the main controller device and the at least one associated module device.

10. The method of claim 1, wherein the main controller device and the at least one associated module device are located on a circuit card of a communication switch.

11. The method of claim 1, wherein the main controller device and the at least one associated module device are located on respective circuit cards in a communication switch.

12. A system for updating software and firmware operating with hardware located in a main controller device and at least one associated device connected thereto, said system comprising:
a processor coupled to memory and a communication device at the main controller device and at the at least one associated device; and,
modules within the memory and executed by the processor, the modules including:
a module for receiving at the main controller device an updated application bundle, the updated application bundle having an updated software element, a set of firmware elements relating to the updated software element, and a firmware loader for loading the firmware elements relating to the updated software element;
a module for determining whether the updated application bundle is operable with a hardware element of the main controller device and the at least one associated device;
a module for installing the updated application bundle in the main controller device and the at least one associated device if the updated application bundle can be operated with the hardware element; and,
a module for utilizing an existing application bundle at the main controller device and the at least one associated device if the updated application bundle cannot be operated with the hardware element;
wherein the module for determining whether the updated application bundle is operable with the hardware element includes:
a module for storing a hardware/software compatibility level value and a hardware/firmware compatibility level value on the main controller device and the at least one associated device;
a module for retrieving the hardware/software compatibility level value and the hardware/firmware compatibility level value with the firmware loader; and,
a module for searching a matrix with the firmware loader using the hardware/software compatibility level value and the hardware/firmware compatibility level value to determine whether a version of the software element and a version of the firmware elements provided in the updated application bundle are compatible with the hardware element, the matrix listing versions of the software elements compatible with the hardware element for the hardware/software compatibility level value and versions of the firmware elements compatible with the hardware element for the hardware/firmware compatibility level value.

13. The system of claim 12, wherein:
the module for receiving at the main controller device the updated application bundle includes a module for storing the undated application bundle in a memory bank at the main controller device having an inactive status; and,
the modules further include a module for storing the existing application bundle in a memory bank at the main controller device having an active status.

14. The system of claim 12, wherein:
the main controller device controls the at least one associated device;
the module for installing of the updated application bundle in the main controller device is activated remotely; and,
the module for installing of the updated application bundle in the at least one associated device is activated by the main controller device.

15. The system of claim 12, wherein the matrix is stored remotely from the main controller device and the at least one associated device.

16. The system of claim 13, wherein the module for installing of the updated application bundle includes:
a module for exchanging the inactive status of the memory bank storing the updated application bundle for the active status of the memory bank storing the existing application bundle;
a module for downloading to the at least one associated module device the updated application bundle from the memory bank storing the undated application bundle; and,
a module for utilizing the updated application bundle instead of the existing application bundle for the main controller device and the at least one associated device.

17. The system of claim 12, wherein the existing application bundle includes an existing software element, a set of firmware elements relating to the existing software element, and a firmware loader for loading the firmware elements relating to the existing software element.

18. The system of claim 12, wherein the updated application bundle is received from a library of application bundles stored external to the main controller device and the at least one associated device.

19. The system of claim 12, wherein the main controller device and the at least one associated device are located on a circuit card in a communication switch.

20. The system of claim 12, wherein the main controller device and the at least one associated device are located on respective circuit cards in a communication switch.

* * * * *

UNITED STATES PATENT AND TRADEMARK OFFICE
CERTIFICATE OF CORRECTION

| | |
|---|---|
| PATENT NO. | : 7,328,434 B2 |
| APPLICATION NO. | : 10/252703 |
| DATED | : February 5, 2008 |
| INVENTOR(S) | : Sheldon Keith John Swanson et al. |

It is certified that error appears in the above-identified patent and that said Letters Patent is hereby corrected as shown below:

1. Claim 7, column 15, line 23: Insert the word --the-- before the word "updated".

2. Claim 9, column 15, line 42: Insert the word --bundle-- after the word "application".

Signed and Sealed this

Tenth Day of June, 2008

JON W. DUDAS
*Director of the United States Patent and Trademark Office*